United States Patent [19]

Annis

[11] Patent Number: 4,515,845

[45] Date of Patent: May 7, 1985

[54] PILE DAMPER MECHANISM

[75] Inventor: Gerald A. Annis, Pittsford, N.Y.

[73] Assignee: Schlegel Corporation, Rochester, N.Y.

[21] Appl. No.: 494,783

[22] Filed: May 16, 1983

[51] Int. Cl.³ .............................................. D03D 27/00
[52] U.S. Cl. ........................................ 428/86; 428/88; 428/90; 428/92; 428/95
[58] Field of Search ....................... 428/92, 86, 88, 90, 428/95, 100, 101, 358

[56] References Cited

U.S. PATENT DOCUMENTS 3,308,490 3/1967 Cacioppo .............................. 428/100
3,906,128 9/1975 Burling ................................... 428/92

Primary Examiner—Marion E. McCamish
Attorney, Agent, or Firm—Cumpston & Shaw

[57] ABSTRACT

A non-hydraulic damper is disclosed having spaced-apart relatively movable members and layers of pile material attached to the members with the fibers of the respective pile layers extending towards each other to interengage and provide selectable resistance to relative movement of the members.

18 Claims, 9 Drawing Figures

PILE DAMPER MECHANISM

This invention relates in general to mechanical dampers and more particularly to a damper wherein the interaction of two pile layers on spaced-apart opposed surfaces of two relatively movable members provides the damping effect.

Dampers per se are well known. Heretofore, such dampers have relied upon the controlled passage of a fluid through a small orifice for providing damping action. Such hydraulic dampers have several disadvantages, including sensitivity to temperature and pressure, the necessity for providing seals between the relatively movable members thereof for constraining the passage of the fluid damping medium to the desired orifices, the necessity for providing close tolerances necessitating the use of expensive machined parts, high cost, limited life, and the difficulty of providing specially selected damping characteristics.

Accordingly, it is an object of this invention to provide a damping mechanism that does not rely on the use of a fluid damping medium.

It is another object of this invention to provide a damping mechanism that does not require the close tolerances or expensive seals required in fluid damping mechanisms in accordance with the prior art.

It is a further object of this invention to provide a damping mechanism that is readily adapted to provide a wide range of damping characteristics including varying characteristics not heretofore obtainable by any prior art mechanisms.

It is a still further object of this invention to provide a damping mechanism that may be manufactured from inexpensive parts such as plastic without degrading the effectiveness of the mechanism. Briefly stated, and in accordance with a presently preferred embodiment of this invention, a damping mechanism includes first and second relatively movable mechanical elements in face-to-face relationship, each of the elements being provided with a layer of pile material on a face thereof. The elements are arranged so that fibers of the facing pile layers engage each other during at least a portion of the range of relative movement of the two elements. Through selection of the pile material, density, degree of overlap, orientation and spacing, a wide range of damping characteristics can be achieved.

The features of the invention which are believed to be novel are set forth in the appended claims. Further advantages of the invention may be more fully appreciated by reference to the following description taken in connection with the accompanying drawing in which:

Figure 1:
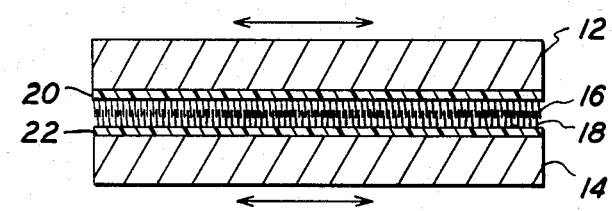
FIG. 1 is a sectional view of a damper having planar opposing surfaces in accordance with this invention.

Referring now to FIG. 1, a damper assembly in accordance with an embodiment of this invention is illustrated including first and second relatively movable members 12 and 14 disposed in spaced-apart relationship and adapated for controlled relative lateral movement, as indicated by the double-headed arrows. First and second pile layers 16 and 18 are attached to opposed spaced-apart facing surfaces of the members 12 and 14, respectively. Where, as in this case, pile layers 16 and 18 are formed on layers of backing material such as backing layers 20 and 22, the pile layers may be affixed to the relatively movable elements by chemically or mechanically attaching backing layers 20 and 22 to facing surfaces of movable members 12 and 14, respectively.

The fibers of pile layers 16 and 18 overlap and provide resistance to relative movement of the members 12 and 14. In contrast to hydraulic dampers, the embodiment of this invention shown in FIG. 1 provides rate insensitive damping characteristics, that is, damping characteristics that are relatively constant with respect to the speed of relative movement.

There are a multiplicity of known methods for forming layers of pile material. One such method includes providing a woven fabric backing strip having tufts of pile fibers extending therethrough and held in place by the threads of the woven backing. Alternatively, a base strip may be made of rubber or plastic sheeting to which the upstanding fibers are secured in any suitable fashion such as by the use of an adhesive, by thermoplastic bonding, flocking or the like. The pile fibers themselves may be upstanding single filament fibers, looped fibers, fibers of round, square, X-shaped or other cross-section, or of any other form or characteristics capable of slidable interengagement with other similar or dissimilar fibers in accordance with this invention.

The materials for the backing strip and pile fibers may be selected from a wide variety of natural and synthetic materials depending upon the particular characteristics required. Pile materials such as known synthetic materials including polypropylene, nylon, orlon or the like, or natural fibers such as mohair, goat hair, wool, jute or the like, or any combination thereof may be used. Non-textile fibers such as metal fibers, carbon fibers, fiberglass fibers and the like, may also be used where specific properties such as electrical conductivity or insulation, weather resistance, thermal insulation and the like are required. Woven backing strips may be provided from any of the above materials or other materials suitable for weaving. Plastic or metal film backing materials such as plastics including polypropylene or other flexible thermoplastic material may be employed. While the invention will be discussed herein in connection with embodiments having opposed facing pile layers alternative embodiments where one of said layers is replaced with a surface having characteristics suitable for frictionally engaging a pile layer, such as an abrasive paper or the like are also contemplated. Such roughened surfaces may take a wide variety of known forms.

Figure 2:
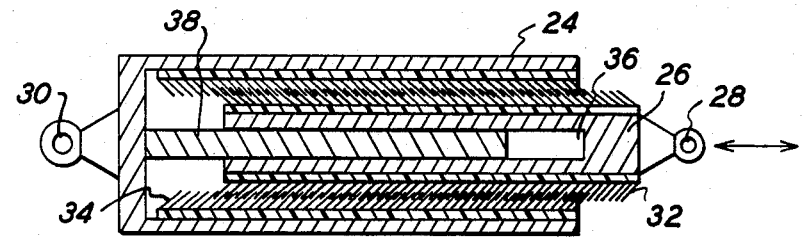
FIG. 2 is a sectional view of a cylindrical damper in accordance with this invention and showing angled pile fibers.

Referring now to FIG. 2, a cylindrical damper in accordance with this invention is shown including an outer relatively movable element 24 and an inner relatively movable element 26 adapted to be connected to other elements of a mechanical system by fastening means 28 and 30 which may be eyes or other well known mechanical fasteners. As in FIG. 1, first and second layers of pile material 32 and 34 are attached to the relatively movable members. The generally upstanding fibers of pile layers 32 and 34 interengage to provide resistance to relative movement. The damper of FIG. 2, as distinguished from the damper of FIG. 1, can employ inclined pile fibers for providing directionally dependent damping characteristics. It will be appreciated by reference to FIG. 2 that as the mechanical elements 24 and 26 are separated, the damping effect will be less than when they are forced together. Inner element 26 may include a cylindrical bore 36 for slidably receiving optional coaxial support 38 of outer element 24. The relative position of pile layers 32 and 34 is thereby maintained as elements 24 and 26 are displaced.

While in FIG. 2 the pile fibers in both layers 32 and 34 are inclined, this is not essential and variations in damping characteristics may be achieved by varying the angles at which one or both of the pile layers are disposed.

Figure 3:
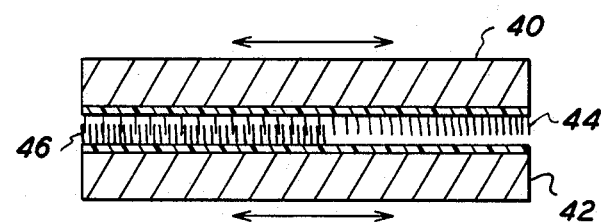
FIG. 3 shows a damper in accordance with this invention having damper characteristics that vary with the relative position of the elements.
Figure 4:
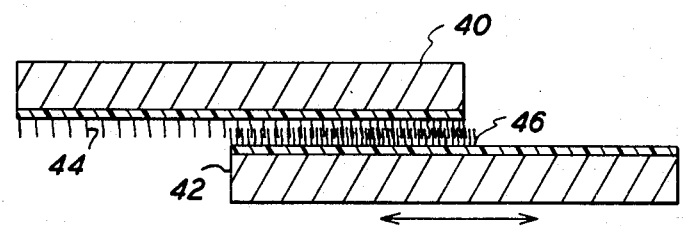
FIG. 4 shows the damper of FIG. 3 in a position exhibiting different damping characteristics.

Still another embodiment of this invention is illustrated in FIG. 3 wherein the arrangement of FIG. 1 is employed but with one or more of the pile layers having a pile density that varies along the length of the movable element. Relatively movable elements 40 and 42 are provided with layers of pile material 44 and 46, respectively. In the embodiment illustrated in FIG. 3, pile layer 46 is of relatively constant pile density, while pile layer 44 has relatively low density at the left-hand edge (as seen in the drawing) of the movable element and a relatively high density at the right-hand edge, so that as the elements are moved from the position shown in FIG. 3 to the position shown in FIG. 4, the damping effect is increased dramatically. While the pile layers of FIGS. 3 and 4 are shown with the pile fibers oriented substantially normal to the surfaces of the relatively movable elements, it will be appreciated that inclined fiber orientations such as illustrated in FIG. 2 may be employed in combination with the varying pile density of FIGS. 3 and 4 to achieve even greater flexibility in providing the desired damping characteristics.

Figure 5:
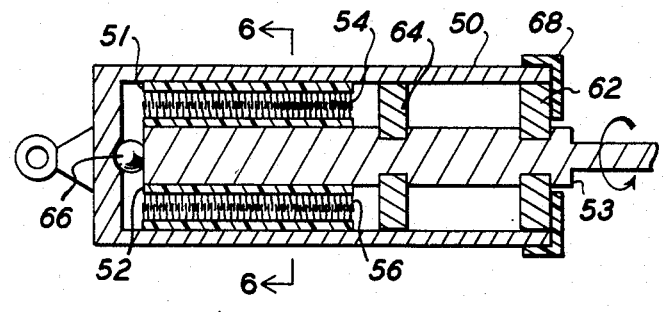
FIG. 5 shows a damper in accordance with this invention particularly designed for damping relative rotational movement.
Figure 6:
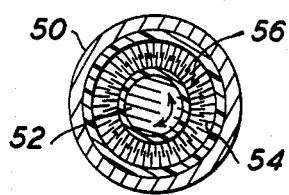
FIG. 6 is a cross-sectional view of the damper of FIG. 5.

FIG. 5 illustrates a damper in accordance with this invention adapted for damping relative rotational movement between two elements. FIG. 6 is a sectional view of the damper of FIG. 5 taken along the line 6—6. The damper shown in FIGS. 5 and 6 includes an outer cylindrical member 50 and an inner cylindrical member 53 disposed in spaced-apart relatively rotatable orientation and having first and second pile layers 54 and 56 including backing layers 51 and 52 attached to elements 50 and 53, respectively. Bearings 62, 64 and 66 support inner member 53 for rotational movement, and end cap 68 prevents axial displacement of member 53. While the pile layers 54 and 56 are shown oriented substantially normal to the surfaces of movable members 50 and 53, respectively, other orientations may be employed for providing increased damping in one rotational direction and decreased damping in the other rotational direction.

Figure 7:
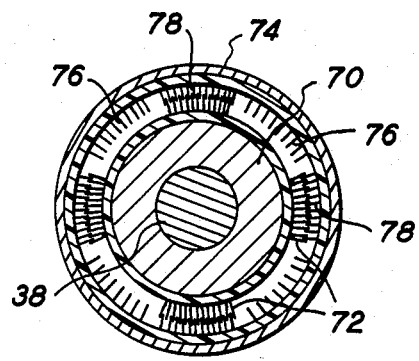
FIGS. 7 and 8 are cross-sectional views of dampers similar to that shown in FIG. 5, but having selectable damping characteristics.
Figure 8:
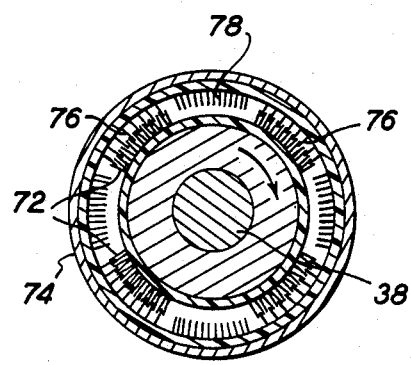

FIGS. 7 and 8 show another embodiment of this invention similar to the embodiment shown in FIG. 2, but adapted to provide selectable damping characteristics in a single device. FIGS. 7 and 8 are cross-sectional views of a cylindrical damper, including inner and outer coaxial elements 70 and 74, adapted for relative coaxial linear motion. Inner member 70 is provided with a plurality of circumferentially spaced-apart pile layers 72 of relatively constant pile density, and outer member 74 is provided with a first set of circumferentially spaced-apart pile layers 76 of a first density and a second set of circumferentially spaced-apart pile layers 78 of a greater density. By rotating inner relatively movable member 70 between the position shown in FIG. 7 and the position shown in FIG. 8, greater and lesser damping, respectively, of the relative coaxial linear motion of the elements may be achieved.

As can be seen in the position shown in FIG. 7, pile layers 72 engage relatively dense pile layers 78 for relatively greater resistance to axial movement, while in the position shown in FIG. 8, pile layers 72 engage less dense pile layers 76 for relatively lower resistance to axial movement. Those skilled in the art will appreciate that additional selected damping characteristics may be provided by providing additional circumferentially spaced-apart pile layers on outer member 74 and additional positions for inner member 76.

The linear and rotational damping characteristics of the embodiments of this invention of FIGS. 6 and 7, 8 may be combined if desired to provide a damper providing both rotational and axial damping not heretofore acheivable.

While pile material has been described including a backing strip to which pile fibers are attached, by selecting appropriate materials for the relatively movable mechanical members, pile fibers may be affixed directly thereto, for example, by thermoplastic welding or by flocking or through the use of an intermediate adhesive layer or by any other technique suitable therefor.

Figure 9:
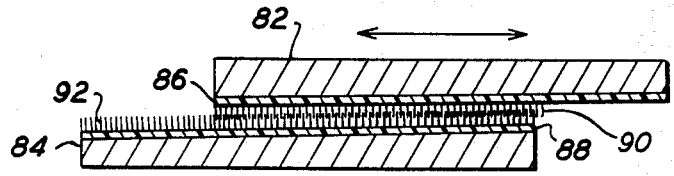
FIG. 9 is a cross-sectional view of another embodiment of this invention.

Further, while relatively movable members disposed at substantially constant spacing have been illustrated, arrangements may be used where the spacing between the members varies with their relative displacement whereby the penetration of the fibers of one pile layer into the fibers of the opposing pile layer increases or decreases with displacement providing an effect similar to that provided by the embodiment of the invention shown in FIG. 3, but without varying the pile density. Such an arrangement is illustrated in FIG. 9. Relatively horizontally movable upper and lower members 82 and 84 include facing pile elements attached to opposing surfaces thereof. Backing layer 86 carrying pile fibers 90 is attached to movable element 82 and backing layer 88 carrying fibers 92 is attached to movable element 84. As element 82 is displaced to the right with respect to element 84, pile fibers 90 and 92 engage more fully and the resistance to relative movement is increased. Still further, while the embodiment of this invention illustrated at FIG. 5 is designed to provide rotational damping by greatly increasing the angle at which the pile layers are disposed, the damping force can be increased to the point of providing a ratcheting action without the need for gear teeth or other conventional mechanisms used therefor. While the invention has been shown and described in connection with a number of presently preferred embodiments thereof, those skilled in the art will recognize that certain modifications and changes may be made thereto without departing from the true spirit and scope of the invention. Accordingly, it is intended that the invention be limited solely by the appended claims.

I claim:

1. A damper comprising first and second relatively movable rigid members having first and second spaced-apart opposing surfaces, means for limiting the relative movement of said members to lateral movement parallel to said surfaces; first and second pile layers on said first and second surfaces, respectively, the fibers of said pile layers at least partially interlocking or overlapping for damping relative movement between said elements.

2. The damper of claim 1 wherein said first and second relatively movable members are cylindrical members disposed co-axially and said first and second said pile layers are disposed on the outer surface on the inner cylindrical member and the inner surface of the outer cylindrical member, respectively.

3. The damper of claim 1 wherein said first and second pile layers comprise pile layers of substantially constant pile density.

4. The damper of claim 1 wherein said first and second pile layers comprise layers of pile of varying density.

5. The damper of claim 1 wherein the fibers of said first pile layer engages only a portion of the fibers of said second pile layer.

6. The damper of claim 1 wherein the fibers of said first and second pile layers are disposed substantially normal to said opposing surfaces of said first and second relatively movable elements.

7. The damper of claim 1 wherein said first and second pile layers comprise pile fibers oriented at an angle less than 90° to said opposing surfaces of said first and second relatively movable elements.

8. A damper comprising first and second relatively movable rigid members having first and second spaced apart surfaces;

means for maintaining a substantially constant spacing between said surfaces while allowing relative movement only in a direction substantially parallel to said surfaces; and a layer of pile on at least one of said surfaces having a plurality of generally upstanding fibers extending towards said other surface; and means on said other surface engaging said fibers for resisting said relative movement of said members.

9. The damper of claim 8 wherein said fibers are oriented at an angle of substantially 90° with respect to said element.

10. The damper of claim 8 wherein said fibers are oriented at an angle of between greater than 0° and about 90° with respect to said element.

11. The damper of claim 8 wherein said means on said other element comprises a second pile layer on said element having pile fibers extending towards and engaging said plurality of generally upstanding fibers.

12. The damper of claim 11 wherein said fibers are oriented at and angle of substantially 90° with respect to said element.

13. The damper of claim 11 wherein said fibers are oriented at an angle of between greater than 0° and about 90° with respect to said element.

14. The damper of claim 11 wherein said pile layer and said second pile layer are of constant pile density.

15. The damper of claim 14 wherein at least one of said pile layers varies indensity along the length of its element.

16. The damper of claim 11 wherein said elements are adapted for relative axial rotation.

17. The damper of claim 11 wherein said elements are adapted for relative rotational movement.

18. The damper of claim 8 wherein said fibers vary in density along said element.

* * * * *

UNITED STATES PATENT AND TRADEMARK OFFICE
CERTIFICATE OF CORRECTION

PATENT NO. : 4,515,845
DATED      : May 7, 1985
INVENTOR(S) : Gerald A. Annis

It is certified that error appears in the above-identified patent and that said Letters Patent is hereby corrected as shown below:

Claim 1, column 5, line 4, "elements" should read --members--.
Claim 6, column 5, line 25, "elements" should read --members--.
Claim 7, column 5, line 30, "elements" should read --members--.
Claim 9, column6, line 10, "element" should read --member--.
Claim 10, column 6, line 13, "element" should read --member--.
Claim 11, column 6, lines 15 and 16, "element" should read --member--.
Claim 12, column 6, line 20, "element" should read --member--.
Claim 13, column 6, line 23, "element" should read --member--.
Claim 15, column 6, line 28, "element" should read --member--.
Claim 16, column 6, line 29, "elements" should read --members--.
Claim 17, column 6, line 31, "elements" should read --members--.
Claim 18, column 6, line 34, "element" should read --member--.

Signed and Sealed this

Twenty-third Day of September 1986

[SEAL]

Attest:

DONALD J. QUIGG

Attesting Officer

Commissioner of Patents and Trademarks